US007936685B2

(12) United States Patent
Kucharczyk

(10) Patent No.: US 7,936,685 B2
(45) Date of Patent: May 3, 2011

(54) INTELLIGENT FAST SWITCH-OVER NETWORK TAP SYSTEM AND METHODS

(75) Inventor: David Kucharczyk, Santa Fe, NM (US)

(73) Assignee: VSS Monitoring, Inc., Burlingame, CA (US)

( * ) Notice: Subject to any disclaimer, the term of this patent is extended or adjusted under 35 U.S.C. 154(b) by 154 days.

(21) Appl. No.: 12/321,165

(22) Filed: Jan. 15, 2009

(65) Prior Publication Data

US 2010/0177644 A1 Jul. 15, 2010

(51) Int. Cl.
*G01R 31/08* (2006.01)
(52) U.S. Cl. .......................... 370/250; 370/252; 370/285
(58) Field of Classification Search .................... None
See application file for complete search history.

(56) References Cited

U.S. PATENT DOCUMENTS

| | | | |
|---|---|---|---|
| 5,781,318 A | 7/1998 | Tremblay | |
| 5,898,837 A * | 4/1999 | Guttman et al. | 709/224 |
| 6,041,037 A | 3/2000 | Nishio | |
| 6,424,627 B1 | 7/2002 | Sorhaug et al. | |
| 6,975,209 B2 | 12/2005 | Gromov | |
| 7,277,957 B2 | 10/2007 | Rowley | |
| 2003/0112760 A1 | 6/2003 | Puppa | |
| 2004/0120259 A1 | 6/2004 | Jones | |
| 2005/0005031 A1 | 1/2005 | Gordy et al. | |
| 2005/0129033 A1 | 6/2005 | Gordy | |
| 2005/0257262 A1 | 11/2005 | Matityahu | |
| 2006/0002370 A1 | 1/2006 | Rabie et al. | |
| 2006/0083511 A1 | 4/2006 | Edmunds | |
| 2006/0153092 A1* | 7/2006 | Matityahu et al. | 370/252 |
| 2007/0002754 A1* | 1/2007 | Matityahu et al. | 370/242 |
| 2007/0064917 A1* | 3/2007 | Matityahu et al. | 379/338 |
| 2007/0180152 A1 | 8/2007 | Montanez | |
| 2007/0253349 A1* | 11/2007 | Light et al. | 370/276 |
| 2008/0049627 A1 | 2/2008 | Nordin | |
| 2009/0040932 A1* | 2/2009 | Matityahu et al. | 370/241 |
| 2009/0041051 A1* | 2/2009 | Matityahu et al. | 370/466 |
| 2009/0245128 A1* | 10/2009 | Matityahu et al. | 370/252 |
| 2010/0135323 A1 | 6/2010 | Leong | |

OTHER PUBLICATIONS

Realtek Integrated 10/100/1000 Single/Dual Gigabit Ethernet Transceiver Datasheet, Rev 1.3, Aug. 3, 2007.
BroadCom BCM5464 Product Brief, Quad-Port 10/100/1000Base-T Gigabit Copper Transceiver, Dec. 11, 2003.
VSS Monitoring Inc., Easy Install Guide, P/N: V1.1 CC-F, Desc. 10/100/1000 1×1 Copper Tap, 8 pages, (C)2003-2005, VSS Monitoring Inc.
VSS Monitoring, Inc., Data Sheet for P/N. V1.1 C.C-F, 10/100/1000 1×1 Copper Tap, 2 pages, (C)2003-2004, VSS Monitoring, Inc.

(Continued)

*Primary Examiner* — Chi H Pham
*Assistant Examiner* — Kouroush Mohebbi
(74) *Attorney, Agent, or Firm* — SNR Denton US LLP

(57) ABSTRACT

An intelligent fast switch-over network active tap system enables active monitoring of a network segment connected between network devices. A fail-safe relay subsystem is coupled between a pair of network ports, enabling transmission of network communications signals through a passive cross-connect between the network ports or through an active bridge subsystem. The active bridge subsystem is capable of independently establishing network links with the network devices, and a separate network link with a monitoring device. A controller manages operation of the relay and active bridge subsystems, including switches between passive and active network transmission through the tap system and to determine and establish the active network links subject to symmetric network link parameters and state. Thereby, the network link status of the connected network devices is preserved on switch between active and passive transmission and correctly reflected in the presence of link and power failures.

28 Claims, 4 Drawing Sheets

OTHER PUBLICATIONS

VSS Monitoring, Inc., Promotional Materials for Link Safe Feature of 10/100/1000 Copper Taps, 1 page, (C)2003-2005, VSS Monitoring, Inc.

Peribit Networks, Inc., PeriScope Central Management System (CMS) 5.0 Administrator's Guide, Part No. 100316, Rev. 003, pp. 100-102 (c)2003-2004, Peribit Networks, Inc.

Peribit Networks, Inc., Sequence Reducer/Sequence Mirror Operator's Guide, Part No. 1000068, Rev. 013A, pp. 24, 60-61 (c)2001-2005, Peribit Networks, Inc.

Canary Communications, Inc. product literature for Fast Ethernet Fiber-to-Fiber Converters, 7 pages, (C)2004, Canary Communications, Inc.

Transitions Networks, Inc. 100Base-TX/100BBase-FX Media Converters E-100BTX-FX-04 User's Guide, 4 pages, (C)1998-2000, Transitions Networks, Inc.

VSS Monitoring; PCT/IB2009/53393 filed Aug. 5, 2009; ISA/US; Feb. 1, 2010; 3 pages.

* cited by examiner

INTELLIGENT FAST SWITCH-OVER NETWORK TAP SYSTEM AND METHODS

BACKGROUND OF THE INVENTION

1. Field of the Invention

The present invention relates generally to network tap devices used to enable monitoring of data transiting switched packet networks and, more particularly, to a fail-safe intelligent network data stream monitor tap device capable of maintaining continuous network availability in the monitored network segment under various tap device failure conditions.

2. Description of the Related Art

Intentional administrative monitoring of Ethernet network segments, and switched data networks in general, is desirable, if not required as a practical matter, in conventional network infrastructures. Network taps are embedded in the network infrastructure in order to derive tap data streams that are routed to dedicated monitoring devices. Conventionally, these monitoring devices include various network use and performance probes, network intrusion detection systems, VoIP recorders, packet sniffers, and other auditing and collection devices. The collected data enables, for example, ongoing evaluation and analysis of network infrastructure performance, including network segment loading, protocol and end-point routing usage, infrastructure configuration and optimization planning, and various forms of error-detection that may reveal present or predict future network infrastructure failures. Examination of the tap data streams also enables detection of the source and nature of intrusion attempts and the evaluation other security concerns.

Various network elements and associated analysis methods have been devised and, over time, evolved, to enable appropriate administrative monitoring of switched data networks. Basic techniques involve a passive tapping of network segments combined with an analog amplification of the derived network data stream signals. With the advent of gigabit speed Ethernet over unshielded twisted pair media, also known as 1000Base-T or the IEEE 802.3z standard, passive tap techniques can no longer be applied to capture and accurately reproduce the packet data stream. Specifically, these network data transmission protocols allow bidirectional data signaling: both ends of a network segment are permitted to simultaneously transmit data on a single wire pair. Use of a passive tap would impose an impractical requirement on monitoring devices to separate the bidirectionally combined signals in order to correctly extract the data packets.

More recently devised active tap devices, such as shown in U.S. Pat. No. 6,424,627, issued Jul. 23, 2002 to Sorhaug et al., are designed to be physically inserted into existing network segments and digitally copy all transiting data packets to a separate network routed to one or more monitoring devices. Data relays are conventionally implemented in parallel with the tap interception of the existing network segment to provide a passive path in protection of the network segment transmission integrity. On power or other failure of the tap device, the data relays close in a fail-safe mode to enable continued use of the network segment. The data relays may also be intentionally closed, forcing passive bypass of the network tap, on occasion for various administrative reasons.

A particular problem arises in connection with the use of active tap devices in networks that employ port-based routing network switches. Characteristically, these problems arise in routed networks that utilize some variant of the spanning tree protocol to automatically ensure loop free connectivity across redundant network links. The spanning tree protocol is a layer-2 protocol that defines a distributed configuration process commonly implemented by the network routers to selectively disable mesh connected network segments as needed to obtain only a single active network path between any two network end points. The formal spanning tree protocol (STP) is defined in the IEEE Standard 802.1D. While currently manufactured network routers typically implement a rapid spanning tree protocol (RSTP), as defined in the IEEE Standard 802.1w, many established network infrastructures still use network routers capable of supporting only IEEE 802.1D.

The spanning tree protocols also define a continuous network topology change monitoring process that will automatically trigger reselection of active and blocked network segments appropriate to account for the topology change. Bridge Protocol Data Units (BPDUs) are passed functionally as keep-alive data packets. Aged failure to receive is interpreted as indicating a topology change, signaling connected routers to block pending completion of the reconfiguration. That is, because of the indeterminate nature of the topology change, which may include the addition of new redundant links, each topology change event immediately causes a potentially wide-ranging network outage. Under the best of circumstances, in a pure RSTP network, the outage can last from several seconds to several tens of seconds and, in mixed STP networks, from 30 to 90 seconds, if not longer.

The switching of a conventional active tap device between active and passive states will result in most circumstances in a network link drop across the monitored segment. Although the physical layer disconnect/reconnect cycle in conventional tap devices can be quite short, depending essentially on the electro-mechanical switch and settle time of the relays, the lost of network link is driven by other factors. Specifically, any difference in link configuration, including difference in connection speed, Automatic Medium Dependent Interface (MDI-X) configuration, and master/slave timing orientation, as applicable to the different 10Base-T, 100Base-T and 1000Base-T Ethernet standard connections, requires that a link drop and communications protocol renegotiation to establish a working network link.

Conventionally, reestablishment of the link through the network segment being monitored will typically occur within a range from one half second to several seconds. Regardless of the actual time required to reestablish the network link, however, the link drop itself is conventionally seen as a topology change event and directly results in a significant and undesired network outage. Although the interruption for link reestablishment might be acceptable in basic network use cases, the wider and significantly longer network outage due to the spanning tree protocol reconfiguration is highly undesirable, if not entirely unacceptable for many high-valued applications, such as telephony and similar continuity critical applications.

Further improvements have been made in conventionally modern active tap devices. These advances are, for example, embodied in a current active top device product, identified as nTAP™, manufactured by Network Instruments, LLC, Minnetonka, Minn. Based on publically available information, this nTAP device supports full-duplex 10/100/1000Base-T connection monitoring with power-loss fail-over to a fully passive connection. The two identified improvements implemented are a connection speed constraint and a connection loss constraint. The connection speed constraint limits both sides of the monitored network segment to the some connection speed, thereby enabling a correct valuing of the carrying capacity of the monitored network segment by the two network devices connected to the remote ends of the monitored network segment. The connection loss constraint forces down the remaining network segment when the active tap device recognizes that the network link through either connected network segment is lost. A consistent connection state is therefore seen by both of the remote end connected network devices. Neither improvement, however, addresses the occurrence of topology change events or prevents network outages due to spanning tree protocol reconfigurations.

SUMMARY OF THE INVENTION

Thus, a general purpose of the present invention is to provide an active network tap system capable of operating transparently within a topped network segment.

This is achieved in the present invention through provision of an intelligent fast switch-over network active tap system that supports active monitoring of a network segment connected between network devices. A fail-safe relay subsystem is coupled between a pair of network ports, enabling transmission of network communications signals through a passive cross-connect between the network ports or through an active bridge subsystem. The active bridge subsystem is capable of independently establishing network links with the network devices, and a separate network link with a monitoring device. A controller manages operation of the relay and active bridge subsystems, including switches between passive and active network transmission through the tap system and to determine and establish the active network links subject to symmetric network link parameters and state. Thereby, the network link status of the connected network devices is preserved on switch between active and passive transmission and correctly reflected in the presence of link and power failures.

An advantage of the present invention is that the active tap system is able to effectively maintain network link status between connected network devices in the presence of a power-loss, power establishment, or intentional switch-over of the active tap device. By operation of the present invention in the preparatory establishment of a network link, an ensuing momentary break in the network connection is of sufficiently short duration that renegotiation of the network link between connected network devices can be avoided, thereby avoiding any wider network outage due to a network topology change event.

Another advantage of the present invention is that a subsystem of cross-connected fail-safe relays ensures proper operation in power-failure conditions, while intelligent monitoring and control of the active tap system enables efficient operation when powered. Transition to passive network signal transmission is automatic on power failures. Transition and continued operation in active transmission are managed by a controller, such as an embedded microprocessor or dedicated logic hardware, that efficiently and effectively monitors network link status and imposes appropriately symmetric operation through the attached network segments.

A further advantage of the present invention is that the use and operation of the active tap system are entirely transparent with respect to connected network devices. The operational behaviors implemented by the present invention impose no administrative or other restrictions on the connected external network devices or network infrastructure in general. Link status and configuration is appropriately reflected to network devices connected the network segment being monitored. Link failures are propagated and switch-over operations performed within the time-out tolerance of the network link protocols to avoid a loss-of-link network condition. Communications probes are conducted in a manner that avoids disruption of connected network devices. Consequently, the presence and operation of the active tap system impose no additional restrictions on the connection and operation of the network components connected to the segment being monitored.

Still another advantage of the present invention is that various embodiments can provide for the active tap monitoring of multiple independent network segments. An aggregator can be used in conjunction with an active tap device to selectively enable tapped data routing, filtering, and aggregation to any of multiple monitor network ports.

DETAILED DESCRIPTION OF THE INVENTION

Figure 1:
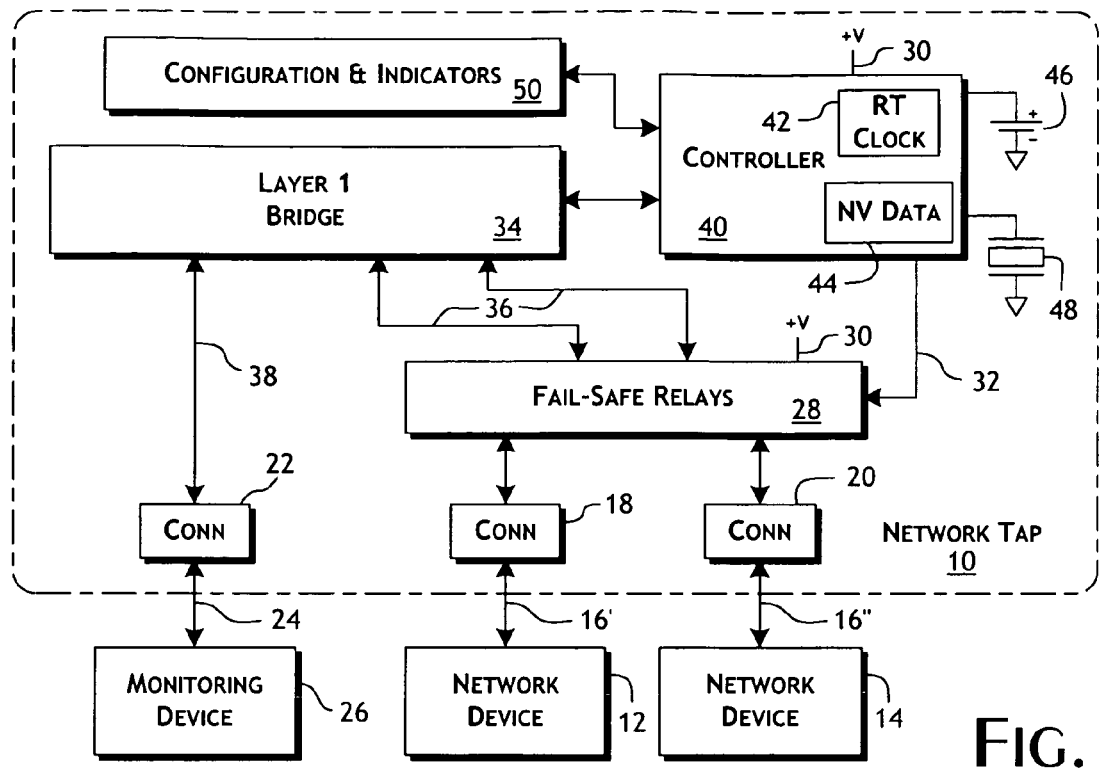
FIG. 1 presents a functional block diagram illustrating an active network top constructed in accordance with a preferred embodiment of the present invention.

An active network tap device 10, constructed in accordance with the present invention, is shown in FIG. 1. The active network tap device 10 is provided to enable monitoring of network communications transmitted through an otherwise contiguous network segment between external network devices 12, 14, typically conventional network switches and routers further connected to client and server computer systems and other network devices. The various preferred embodiments of the present invention will implement a combination of features including fast fail-over at all supported protocol connection speeds, multimode communications speed control, preemptive MDI-X management, and adaptive fail-over management. For convenience of description, these features will be described as implemented in combination in a comprehensive embodiment. Those of skill in the relevant art will appreciate the utility and steps necessary to realize the various sub-combinations that may be constructed in accordance with the present invention.

The active network tap device 10 is initially installed by intercepting the physical cabling of a typically existing network segment 16 and connecting the resulting network segments 16', 16" through paired network ports 18, 20. The active tap device 10 operates, when enabled, to transparently intercept, or tap, the network data stream traveling through the network segment 16 and route the tapped data stream through one or more monitor ports 22 and monitor network segments 24 to external connected network monitoring devices 26. This allows monitoring devices 26 to analyze, record and report on the performance and operation of the tapped network segment 16. In a preferred embodiment of the present invention, the active network top monitoring device 26 is constructed as a rack-mountable system exposing a power connector and multiple physical Ethernet network connectors for electrical copper cable and accepting power from a conventional power source.

In a basic preferred implementation, a single pair of network ports 18, 20, supporting linking of one discrete network segment 16, are supported by a single active network tap device 10. Internally, the network ports 16, 18 are interconnected by a fail-safe relay-based physical data link bypass mechanism 28. On loss of applied power 30, such as when the active network tap device 10 is manually powered down or subject to a loss of external power or otherwise forced inactive, an array of electro-mechanical relays present within the data link bypass mechanism automatically switch to cross-connect and maintain passive data transmission connectivity between the network ports 18, 20. In the preferred embodiments, conventional electromechanical switches typically capable of switch and settle within about 20 milliseconds are used.

The switching of the data link bypass mechanism 28 is further preferably controlled by an applied control signal 32. In the presence of both power 30 and the control signal 32, the network ports 18, 20 are independently connected to an active network bridge 34 via separate connections 36. The active network bridge 34 implements an active data transmission cross-connection completing a controlled network link path between the network ports 18, 20. In the preferred embodiments of the present invention, the active network bridge 34 is implemented as a physical layer bridge, operating at OSI Reference Model Layer 1, using a conventional Ethernet physical layer network integrated circuit. Preferred physical layer integrated circuits include the Broadcom BCM5464 and BCM5488, as manufactured and sold by Broadcom Corp., Irvine, Calif. Taps on the cross-connection are also preferably connected 38 from the active network bridge 34 to the monitor port 22.

A system controller 40 is preferably provided to manage operation of the active network bridge 34 and selectively provide the control signal 32 to the data link bypass mechanism 28. In support of the optional features, the system controller can include a clock controller 42 and non-volatile memory 44 with, as needed, by an external battery 46 and crystal 48 for maintaining state and timing operations across power-loss conditions. Externally accessible configuration controls and indicators 50 are also preferably supported by the system controller 40. In preferred embodiments of the present invention, the system controller 40 may be implemented using a complex programmable logic device (CPLD) or an embedded microcontroller, such as the RCM3000 manufactured by Rabbit Semiconductor, Inc., Davis, Calif. The CPLD may be preferred where low-cost and a limited number of network segments 16 are being monitored. An embedded micro controller, with independent network port access, may be preferred where remote administration is desired and where a larger number of network segments 16 are being monitored.

Figure 2:
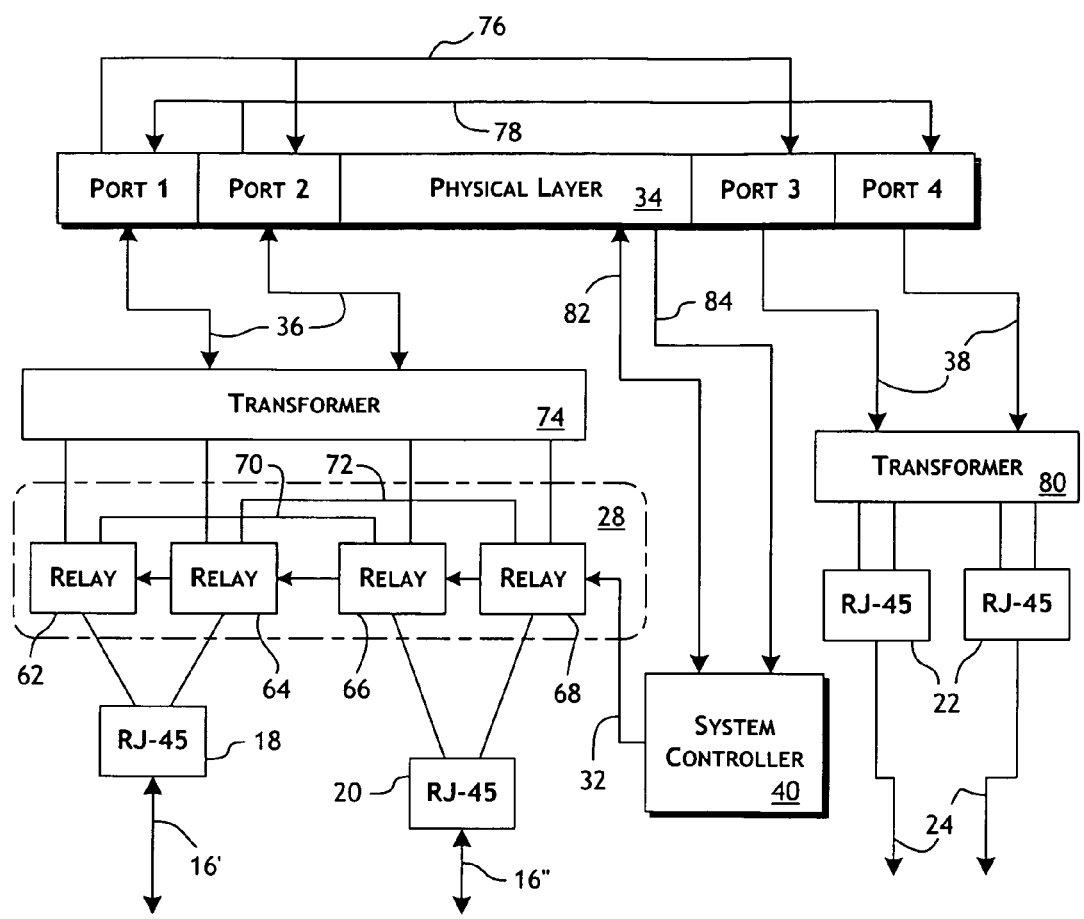
FIG. 2 provides a detailed block diagram view of an active network tap system constructed in accordance with a preferred embodiment of the present invention.

Referring to FIG. 2, a further detailed diagrammatic view of a preferred implementation of the basic active network tap device 10 is provided. Specifically, the network segment 16' connects through an RJ-45 network port 18 connector to relays 62, 64 provided within the data link bypass mechanism 28. The network segment 16" similarly connects through an RJ-45 network port 20 connector to relays 66, 68. The relays 62, 64, 66, 68 are preferably configured such that, in the default, power-failed configuration, the relay outputs are cross-connected 70, 72 to provide a passive data transmission path through the data link bypass mechanism 28. Conversely, when power 30 is present and the switch control signal 32 is provided, the relays 62, 64, 66, 68 connect the signal paths through a conventional isolation transformer array 74 to the active network bridge 34. The network segment 16' connects to a first port $34_1$ and network segment 16" connects to a second port $34_2$.

As generally shown, a bridging cross-connection 76, 78 is established between the digital data link layer interfaces of the ports $34_1$, $34_2$. The bridge connections 76, 78 are also tapped to source digital copies of the network data streams to two additional ports $34_3$, $34_4$ provided by the data link bypass mechanism 28. These tapped data ports $34_3$, $34_4$ connect 38 through a transformer 80 and monitor ports 22 to provide the tapped network data stream to any monitor device 26 connected to the monitor network segment 24. Finally, the system controller 40 is connected to the data link bypass mechanism 28 to allow programming 82 of embedded control registers and status monitoring 84 of the data link bypass mechanism 28, including the operating state of the individual ports $34_1$, $34_2$, $34_3$, $34_4$.

Figure 3:
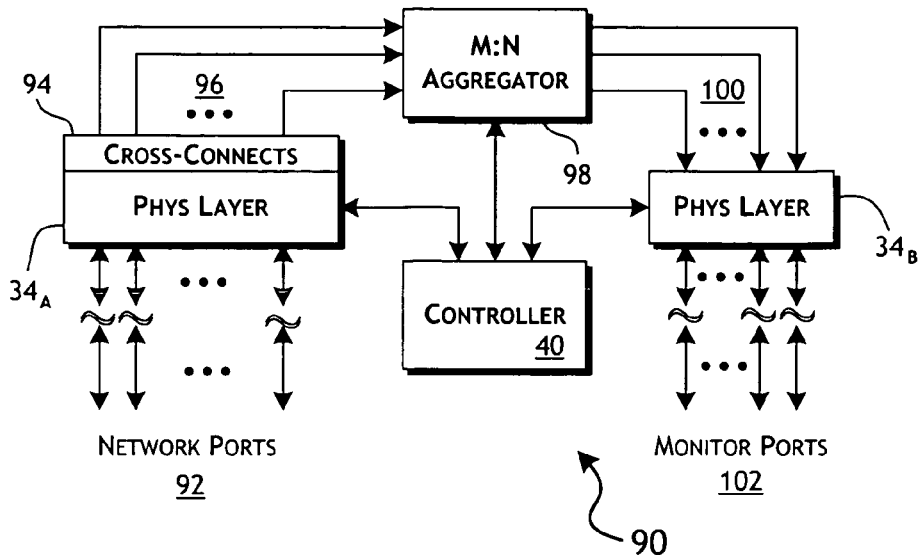
FIG. 3 provides a simplified block diagram view of an alternate embodiment of the present invention implementing a multiple network segment active network tap allowing selective routing, filtering and aggregation of tapped network data to multiple monitor network ports.

In accordance with the present invention, alternate embodiments of the active network tap device 10 can be constructed to support tapping of multiple network segments. As generally shown in FIG. 3, an active network tap device 90 can be constructed to intercept four, eight, sixteen, or more (M) network segments. Consistent with the architecture of the active network tap device 10, as shown in FIG. 2, pairs of network ports 92 connect intercepted network segments through to corresponding ports of an active network bridge $34_A$. Bridging cross-connections 94 are established between the digital data link layer interfaces of the active network bridge $34_A$ ports. Tapped data stream lines 96 are further connected either directly to corresponding digital data link layer interfaces of the ports of an active network bridge $34_B$ or to an aggregator 98. Use of an aggregator allows the number of tapped data stream lines 96 to be reduced by selection utilizing an aggregator 98, functioning as a switch or router, to a fewer number (two, four, eight, or N) of monitored data stream lines 100 that are, in turn connected to corresponding digital data link layer interfaces of an active network bridge $34_B$. These monitor data streams are then output through a corresponding number of monitor ports 102.

Figure 4:
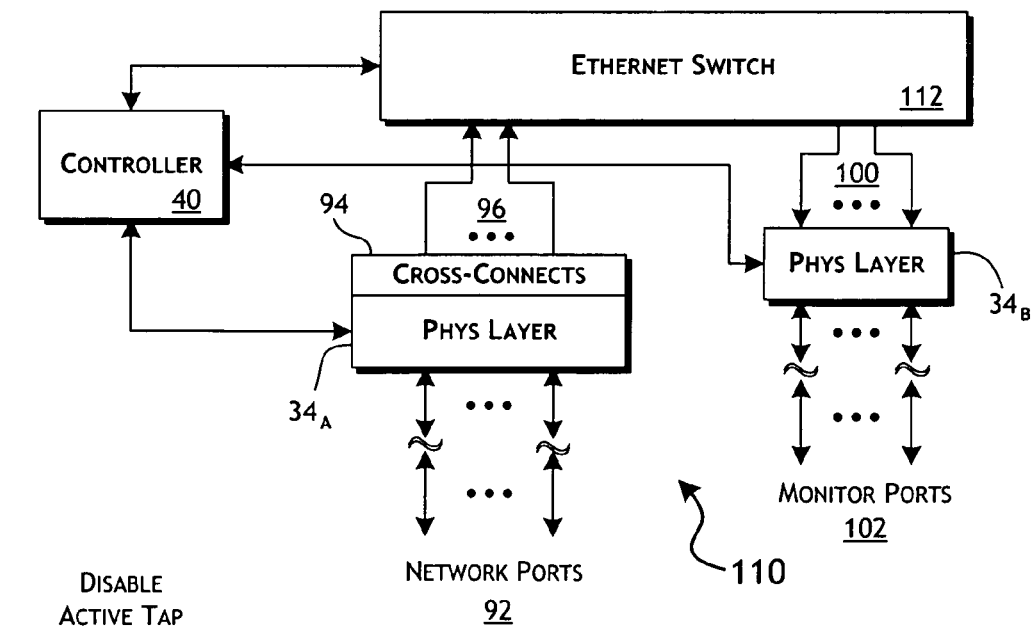
FIG. 4 provides a simplified block diagram view of an Ethernet switch-based embodiment of the present invention enabling enhanced selective routing, filtering and aggregation of tapped network data to multiple monitor network ports.

For preferred embodiments of the present invention incorporating the aggregator 98, the configuration of active network bridges $34_A$, $34_B$ and cross connections 94 is preferably implemented as the physical layer of the system described in Ethernet Switch-Based Network Monitoring System and Methods, Ser. No. 12/157,043, by D. Kucharczyk et al., which is assigned to the assignee of the present invention and hereby incorporated by reference. In summary, as illustrated in FIG. 4, the aggregator 98 operates functionally as an Ethernet switch 112 managed by the controller 40, to selectively route tapped data streams, as received on the data stream lines 96, to selected output monitor data stream lines 100. The ethernet switch provides controlled support for routing input data streams to zero or more of the output lines 100 through switched data path selection, aggregation of multiple input data streams onto a selected one of the output data stream lines 100, and binding of output data streams onto multiple output data stream lines 100.

Figure 5:
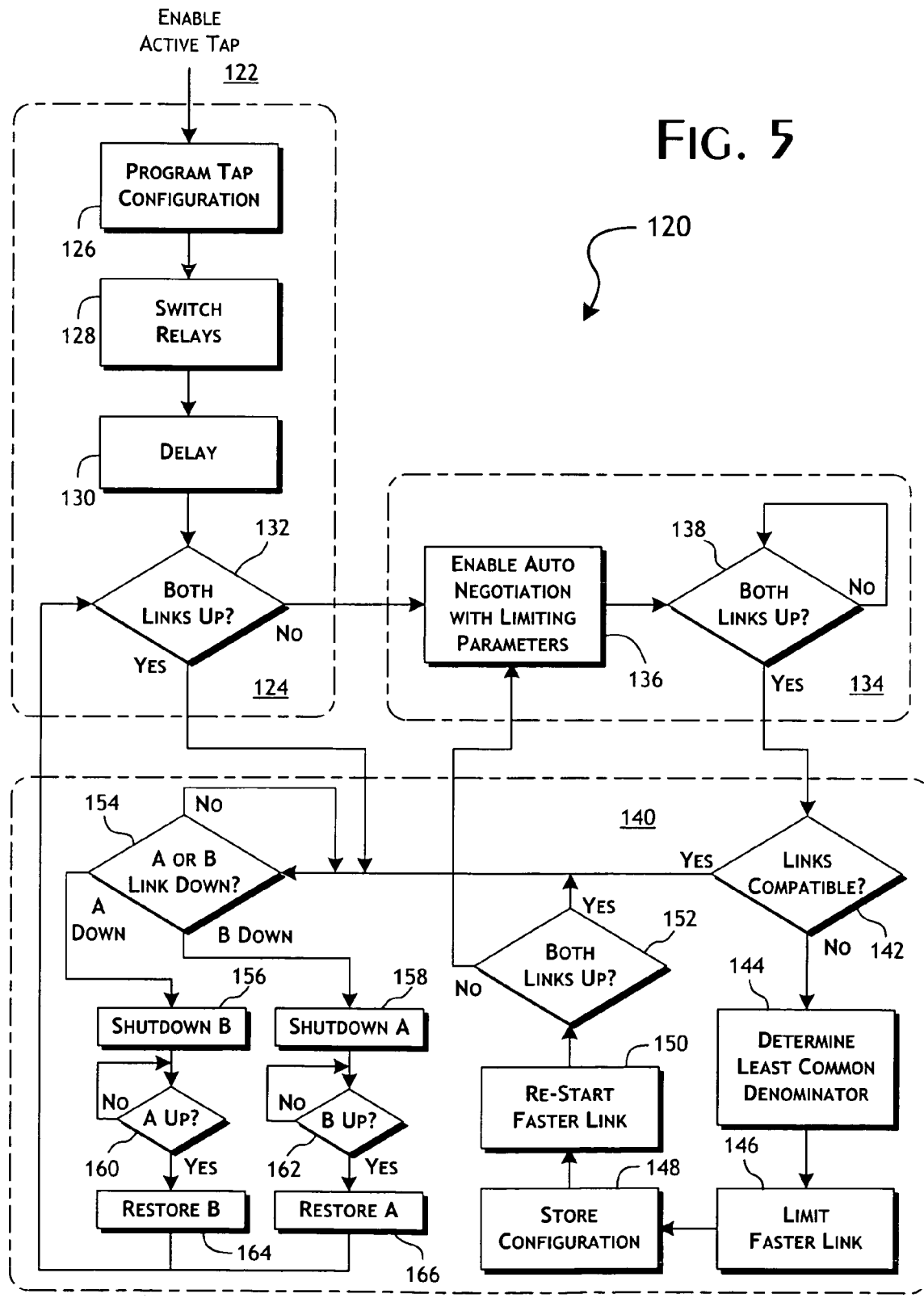
FIG. 5 provides a flow diagram illustrating a preferred enabling operation of an active tap system constructed in accordance with the present invention.

Referring to FIG. 5, the preferred operation 120 of the active network tap system 10 in response to an enabling event is shown. A tap enabling event 122 can include application of power to the active network tap system 10, operator actuation of a configuration switch 50, or receipt of an administrative command issued to the controller 40 through a communications port directly hosted by the controller 40 (not shown). In response to the enabling event 122, the active network tap system 10 initiates a fast switch-over operation 124. Conventionally, the ports of an Ethernet physical layer chip are designed to independently detect and auto-negotiate a network link with another Ethernet physical layer chip over a network media, such as unshielded twisted pair copper cable. Auto-negotiation enables the ports to self-determine mutually compatible Ethernet link setup parameters such as duplex and speed.

When enabled to perform auto-negotiation, a port on the physical layer chip will attempt to detect another port connected through the network media by issuing a periodic series of low speed pulses and check for the presence of incoming pulses. If such pulses are seen, the two physically connected ports will then use the pulse stream to convey basic information about communications capabilities such as speed, duplex and supported protocol options. Once a matching combination is negotiated, a formal network link is established at the agreed upon settings. The physical layer chip at each end of the link signals a link status update to any locally connected controller. Data can then be transferred through the physical layer chip port.

Conventionally, the auto-negotiation start-up to link establishment time can vary from between 500 and 3500 milliseconds. Typically, the more complex the protocols and options supported by a particular physical layer chip the longer the negotiation phase will last. Ordinary 10 and 100 megabit per second (Mb/s) devices will typically complete the negotiation process in just under one second. A 1000 Mb/s capable device will often take two or three seconds in order to evaluate the additional configuration and options information that must be transferred. As the underlying link protocols become more complex, and progression to 1 and 10 gigabits per second (Gb/s) rates are expected, the network link start-up time will become more protracted.

In accordance with the present invention, auto-negotiation is disabled for fast switch-over operation 124. Preferably, a default set of Ethernet link setup parameters is stored by the non-volatile memory 44. During initialization, these parameters are written 126 by the controller 40 into appropriate physical layer chip configuration registers controlling the various network segment ports 16', 16" of the active network bridge 34 to correspondingly disable auto-negotiation. These parameters, as applied to the physical layer chips, also establish an initial network link connection configuration, including as applicable speed, duplex, and master/slave orientation.

The relays 28 are then switched to route the network data streams to and from the active network bridge 34. After a short timed delay 130, preferably of approximately 200 milliseconds for Ethernet 1000Base-T, to allow fully for relay switch-over and settling, as well as any required communication symbol re-synchronization, the controller 40 will inspect 132 the network link status of the network ports 16. In the preferred embodiments of the present invention, network link status on a per port basis can be read from registers internal to the Ethernet physical layer chips or through hardware connections provided by the physical layer chips. If the network link status for both members of a network segment indicate an up status, then the default programmed Ethernet link setup parameters were correct for the corresponding network devices 12, 14 connected through the tapped network segment 16. The switch-over was therefore completed without the network devices 12, 14 failing either of the network segment links 16', 16". For purposes of the present invention, a passive to active and, equivalently, active to passive network data stream transmission transition without loss of the network link as recognized by the network devices 12, 14 is a fast switch-over. That is, the fast switch-over occurs within the tolerances of the network devices 12, 14 to consider any data lost during the switch-over a transient event and not a loss of link event that could, in turn, be seen as a topology change event.

Where both segment links 16', 16" are not immediately detected as up 132, an active configuration phase 134 is entered. The physical layer interfaces of the network port pair connected to the network segments 16', 16" are configured to enable a limited auto-negotiation and are then restarted 136. This configuration of the interfaces is preferably constrained, as applicable, so that one interface is designated with a master orientation and the other a slave. The master/slave orientation is preferably determined from the last stored configuration 44 or, in the absence of a prior successful configuration, to an arbitrarily selected assignment of master/slave orientation. The limited auto-negotiation allows the Ethernet physical chips to perform network probing and capability exchange with any connected remote network devices 12, 14 subject to advertisement of only the speed and duplex defined by the active tap configuration 126 values. If either network segment 16', 16" does not respond 138 as properly connected to a remote network device 12, 14, the speed and duplex auto-negotiation restrictions are removed, allowing the interfaces to advertise all parameters the interface chips are capable of supporting. In the preferred embodiments, the auto-negotiation process is monitored 138 and allowed to proceed only where connections through both network segments 16', 16" can be established so that, on connection, both network devices 12, 14, will have the some perception of the state of the segment 16. Consequently, as part of the network infrastructure fail-over to backup network segments, the network connectivity evaluation performed to assess the network topology change will be consistent with operation had the active network tap system 10 not been present in the infrastructure.

Where both network segments 16', 16" are found 148 connected to responsive network devices 12, 14, a connection monitoring phase 140 is then entered. The active network tap system 10 then determines whether compatible links can be established 142. For purposes of the present invention, network link compatibility is required to ensure that the active network tap system 10 will operate transparently within the network infrastructure, particularly where the active network tap system 10 switches to passive transmission of network data streams. In accordance with the present invention, network link compatibility requires that the network speed, duplex state, and potentially other Ethernet link parameters are the same for the auto-negotiated links established on the network segments 16', 16".

In the preferred embodiments of the present invention, the active network tap system 10 supports network protocols, such as 1000Base-T, that require different, typically complementary, Ethernet link parameters to be established at the ends of an operating network link. The 1000Base-T protocol, for example, requires one network device 12, 14 to be designated as a timing master, using a local internal clock as the timing basis for the network data stream, while the other network device 14, 12 is designated a slave and uses the network data stream itself as the data timing basis. Status as master or slave is conventionally determined as part of the auto-negotiation of a 1000Base-T network link and may be randomly assigned. Other protocols, such as 10GBase-T, may involve further parameters requiring compatibly controlled selection. For purposes of the present invention, the network link compatibility test 142 considers the set of Ethernet link parameters to be compatible where the parameters would be correct for a network link established directly between the network devices 12, 14.

If the network link compatibility test 142 fails, the controller 40 will then determine 144 a compatible network link configuration based on an examination of the Ethernet link parameters, indicating the capabilities of the remote network devices 12, 14, as read from registers within the corresponding ports of the physical layer chips of the active network bridge 34. The values read will reflect the advertised network communications capabilities of the particular connected network device 12, 14. In effect, the configuration chosen by the controller 40 is the best fit configuration for each of the network ports 92 of the network segments 16', 16". The best fit configuration, for purposes of the present invention is the same-speed, highest throughput configuration that can be compatibly established for both network segments 16', 16". In typical operation, only the port that negotiated a higher performing network link will need adjustment.

On determination of a compatible configuration for the network port pair of segments 16', 16", the faster link is brought down, and the compatible configuration parameters are written 146 to the registers controlling the corresponding Ethernet physical chip port. This newly determined compatible configuration of Ethernet link parameters is preferably then stored 148 in the non-volatile memory 44 as a current configuration parameter set. The down network link is then re-enabled 150 to permit establishment of the network links through the active tap device 10. The resulting network link will be established with the correct Ethernet link parameters, just as if the two network devices 12, 14 had directly negotiated.

The controller 40 then checks the network links status 152. If, for any reason, both links are not marked up, the active configuration phase 134 is re-entered to renegotiate a compatible set of Ethernet link parameters 136. Conversely, where both links are established with an up status 132, 152, as well as when the links are determined initially compatible 142, the controller 40 will continue to check for any link failure 154 on the network port pair of segments 16', 16". In response to a link failure through a network port A, corresponding to the segment 16', the complementary network port B, corresponding to the segment 16", is shutdown 156. The network port A status is monitored 160 and, on link re-establishment, the network port B is re-enabled 164. Similarly, on a link failure through the network port B, corresponding to the segment 16", the complementary network port A, corresponding to the segment 16', is shutdown 158. The network port A status is monitored 162 and, on link re-establishment, the network port B is re-enabled 166. Execution continues with the controller 40 inspecting 132 the network link status of the network ports 16.

The storage 148 of updated Ethernet link parameters in the non-volatile memory 44 is optional in a basic alternate implementation of the present invention. A fixed default set of Ethernet link parameters is stored in the non-volatile memory 44. In current embodiments of the present invention, the active network tap system 10 supports up to 1000Base-T network links. The default configuration parameter set provides for network port pairs configured for 1000 Mb/s speed and full-duplex data transmission, with one port of a port pair set for master timing and the other for slave timing. Using this default, the dynamic determination and establishment of compatible link parameters 142, 144, 146, 150 will still correctly achieve compatible network links through the network segments 16', 16" in all but very exceptional circumstances.

By storing the most recently determined compatible set of Ethernet link parameters in the non-volatile memory 44, the subsequent programming of the active tap configuration 126 will, in most active tap device 10 usage scenarios, result in a successful immediate fast switch-over operation 124. In ordinary power-loss scenarios, the compatible link configuration will be restored 122 on power recovery to the active tap device 10. In ordinary loss-of-link scenarios, involving a loss of power to either of the network devices 12, 14 or physical disconnect of either of the network segments 16', 16", using a current stored configuration is desirable, but not necessary as a practical matter. The network outage due to the corresponding topology change will greatly exceed the time required to redetermine compatible network link parameters. Preserving the current configuration in at least volatile memory will be sufficient to maintain fast switch-over operation 124 in response to administrative switching between active and passive operation of the active tap device 10.

Figure 6:
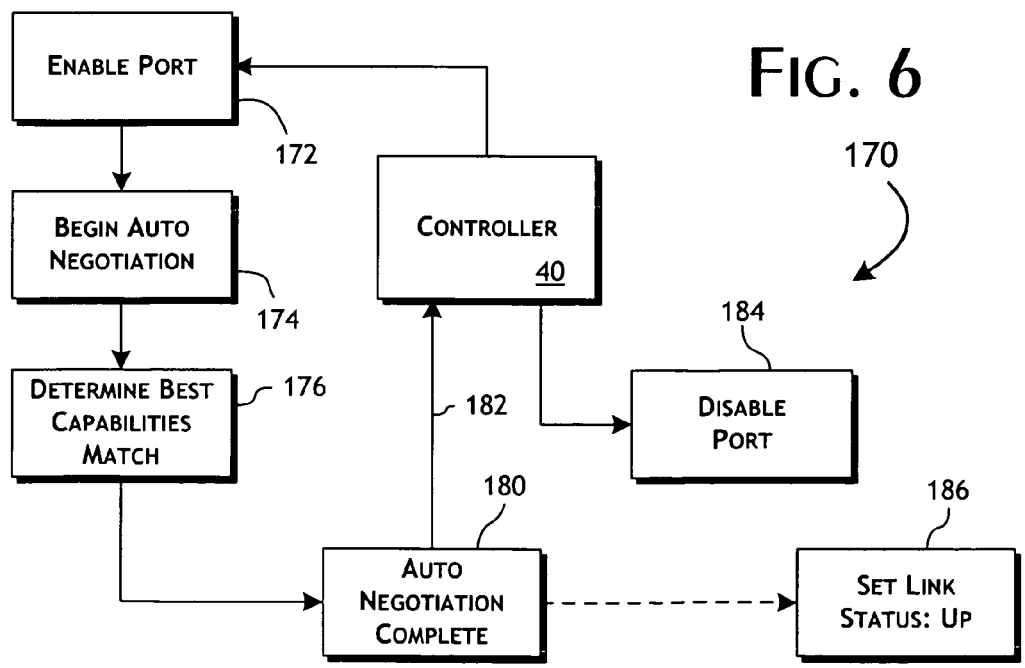
FIG. 6 provides a flow diagram illustrating a preferred implementation of a network link probe operation as used in an active tap system constructed in accordance with the present invention.

In determining whether a network segment 16', 16" is connected 142 to a responsive remote network device 12, 14, the present invention operates to actively test for the potential to establish network likes while, at the same time, avoiding creation of temporary network links. A network link established through one, but not both of the network segments 16', 16", even if immediately forced down, is sufficient to cause a topology change event. Additionally, repeated operation could potentially cause unintended operation of the connected network device 12, 14, as the network link with the remote device may be seen to come up and fail repeatedly. In an alternate embodiment of the present invention, when either of the network ports 92 are enabled to begin auto-negotiation, the controller 40 preferably implements a network probe process 170, as shown in FIG. 6, to control and selectively allow network links to come up and operational with respect to the network devices 12, 14.

To evaluate the potential for establishing a network link over a particular network segment 16', 16", the corresponding network port 92 on the physical link chip is first enabled 172 and allowed to proceed with auto-negotiation 174, including capability determination 176. On completion of auto-negotiation 180, the physical link chip will generate an auto-negotiation complete signal, provided directly or in conjunction with the generation of an interrupt, on a line 182 connected to the controller 40. On receipt of the auto-negotiation complete signal, the port is immediately re-disabled 184 by the controller 40, thus preventing the port from reaching a network link up state 186. Consequently, the port will be prevented from establishing an active network link with the corresponding connected network device 12, 14 that, in turn, could affect the operational behavior of the network device 12, 14 and connected network infrastructure. At the same time, the probe process 170 allows the controller 40 to accurately verify that the network device 12, 14 connected to a specific network port 92 is responsive and capable of establishing a fully functional network link with the active network tap device 10.

Figure 7:
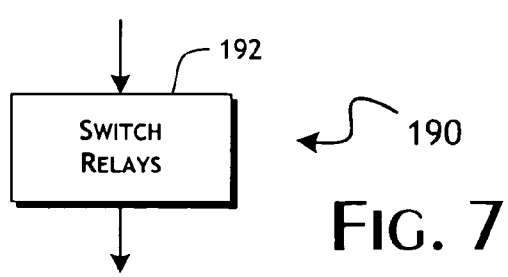
FIG. 7 provides a flow diagram illustrating a preferred disabling operation of an active tap system constructed in accordance with the present invention.

Finally, as generally shown in FIG. 7, the controller 40 preferably implements an active tap disable process 190. On a determination to disable active tap monitoring of one or more of the network segments 16, the controller 40 will provide 192 the control signal 32 to switch the relays 28 to passive cross-connect of the network segments 16', 16". In the preferred embodiments of the present invention, the relays 28 for all network ports 92 are switched at the same time. In alternate embodiments, individual control signals may be provided to corresponding port pairs of the relays 28.

The determination to disable active tap monitoring may be made in response to an administrative command, received through an administrative network connection directly supported by the controller 40, or a local signal generated by the toggling of a configuration switch 50. In addition, the controller 40 may determine to disable active tap monitoring based on operating conditions of the active network top monitoring system 10. In the preferred embodiments of the present invention, the controller 40 is connected to and monitors the internal functioning of the active network tap monitoring system 10. Functions and parameters monitored preferably include internal voltages, temperature, data error rates, and mis-configurations of network port pairs. If an error condition is found that cannot be corrected by actions of the controller 40, the relays 28 will be switched to passive transmission, effectively bypassing internal failed electronics and ensuring continuity of the network segments 16.

Additionally, the controller 40 preferably maintains an event log, supported by the real-time clock circuit 42, of power interruptions and other transient failures. If the power input is determined by the controller 40 to be unstable or the active network top monitoring system 10 appears to be cycling on and off due to an internal or external fault, the controller 40 will maintain a passive network connection through the relays 28, thereby preventing an excessive series of network interruptions.

Thus, a system and methods for providing a fail-safe intelligent network data stream monitor tap device capable of supporting fast switch-over between active and passive data stream transmission of monitored data streams has been described. While the present invention has been described particularly with reference to current network protocol specifications, the operating principles can be applied to 100Base-Tx, 10GBase-T, and other protocols, including protocols that have not yet been formalized.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. An active tap system comprising:
   a) a pair of network ports respectively coupleable to first and second data network segment endpoints;
   b) a monitor port coupleable to a monitoring network segment endpoint;
   c) a relay subsystem coupled between said pair of network ports, said relay subsystem being operative, in response to a control signal, to selectively cross-connect said pair of network ports for the passive transmission of network signals between said pair of network ports;
   d) an active bridge subsystem coupled through said relay subsystem between said pair of network ports and further coupled to said monitor port, said active bridge subsystem being operative to independently establish network link communications with said first and second data network segment endpoints and said monitoring network segment endpoint; and
   e) a controller coupled to said relay subsystem and to said active bridge subsystem, said controller being operative to provide said control signal to selectively connect said pair of network ports to said active bridge subsystem, said controller being further operative to establish symmetric predetermined network link communications parameters in the network link communications between said first data network segment endpoint and said active bridge subsystem and between said active bridge subsystem and said second data network segment endpoint, whereby network link status between said first and second network segment endpoints is maintained during a fast switch-over from an active mode for the transmission of network signals through said pair of network ports to a passive mode for the transmission of network signals through said pair of network ports.

2. The active tap system of claim 1 wherein said relay subsystem is further operative to force a passive transmission cross-connect of said pair of network ports on a loss of applied power.

3. The active tap system of claim 1 wherein said controller is operative to force a consistent applicable master-slave orientation in establishing said symmetric predetermined network link communications parameters.

4. The active tap system of claim 1 wherein said controller is operative to force a common network link communications data rate in establishing said symmetric predetermined network link communications parameters.

5. The active tap system of claim 1 wherein said controller is operative to force a complementary network link communications failure when a network link communications failure is detected relative to either or said first and second data network segment endpoints.

6. A method comprising:
   a) providing passive and active bridges forming alternate network connections between first and second network ports, wherein said active bridge supports establishment of independent first and second network links through said first and second network ports, and wherein said active bridge further supports establishment of a monitor network link through a monitor network port;
   b) dynamically determining from said first and second network links a symmetric set of network link parameters for said first and second network links;
   c) programming said active bridge with said symmetric set of network link parameters such that network communications transmitted along said first and second network links are constrained within said symmetric set of network parameters; and
   d) enabling the switching of a network communications connection between said first and second network ports through either of said passive bridge and said active bridge.

7. The method of claim 6 further comprising the step of storing said symmetric set of network link parameters and wherein said step of programming includes reading and applying said symmetric set of network link parameters to said active bridge to correspondingly establish network link parameters used in establishing said first and second network links.

8. The method of claim 6 wherein said step of dynamically determining includes the steps of:
   a) evaluating network link capabilities received from a first external network device and a second external network device respectively coupled to said first and second network ports; and
   b) identifying said symmetric set of network link parameters as representing the maximum throughput performance achievable in common by said first and second external network devices and said active bridge.

9. The method of claim 6 further comprising the step of autonomously terminating either of said first and second network links whenever a complementary one of said first and second network links is terminated.

10. The method of claim 6 further comprising the step of probing for a network link through said first and second network ports where the corresponding status of said first and second network links is terminated, said step of probing including the steps of:
 a) attempting to establish a network link; and
 b) terminating said step of attempting before a network link is established.

11. An active tap system comprising:
 a) a first, second, and third network interface respectively coupleable to a first data network segment endpoint, a second data network segment endpoint, and a monitoring network segment endpoint;
 b) a relay system selectively operable to establish active and passive cross-connections between said first and second data network segment endpoints, wherein said active cross-connection is routed through said first and second network interfaces; and
 c) a controller coupled to said first and second network interfaces and operative to determine respective first and second network connection states relative to said first and second data network segment endpoints, wherein a network connection state is at least one of an active cross-connection state and a passive cross-connection state, and to control predetermined network connection parameters of said network connection states, wherein said controller is further coupled to said relay system and operative to transmit a control signal to said relay system, wherein receipt of said control signal by said relay system enables said relay system to selectively perform a fast switch-over between active and passive cross-connection states by switching over between said active and passive cross-connections.

12. The active tap system of claim 11 wherein said controller is further operative to selectively determine whether control of said predetermined network connection parameters in combination with a controlled switch of said relay system between said passive and active cross-connections is necessary to implement said fast switch-over between active and passive cross-connection states and apply said predetermined network connection parameters in combination with the controlled switch of said relay system between said passive and active cross-connections responsively to the determination.

13. The active tap system of claim 12 wherein said controller is operative to autonomously evaluate predetermined operating conditions of said passive and active cross-connections when determining whether to the enable said controlled switch of said relay system between said passive and active cross-connections.

14. The active tap system of claim 13 wherein said predetermined operating conditions include frequency and duration of failures in the respective first and second network connection states.

15. The active tap system of claim 11 further comprising a real-time clock circuit communicatively coupled to said controller, wherein said controller is operative to detect a frequency and duration of applied power failures via communication with said real-time clock circuit.

16. The active tap system of claim 11 wherein said controller is operative to autonomously perform self diagnostics to determine failures in said active tap system, including in said relay system.

17. The active tap system of claim 11 further comprising a persistent memory coupled to said controller, wherein said controller is operative to store a predetermined of network connection parameters in said persistent memory, retrieve and apply said predetermined set of network connection parameters to said first and second network interlaces in performance of a fast switch-over between active and passive cross-connection states.

18. The active tap system of claim 11 wherein said first and second network interfaces are enabled to execute an auto-negotiation process and said controller is further operative to restrict the execution of said auto-negotiation process of at least one of said first and second network interfaces in conjunction with the application of said predetermined set of network connection parameters to said first and second network interfaces.

19. The active tap system of claim 18 wherein said controller is further operative to monitor the execution of the auto-negotiation process of said first and second network interfaces, to autonomously determine mutually compatible network connection parameters corresponding to a highest common network data transfer rate, to store said mutually compatible network connection parameters to a persistent memory as said set of network connection parameters, and to apply said predetermined set of network connection parameters to said first and second network interfaces.

20. The active tap system of claim 11 wherein said controller is operative to send a control signal to said relay system, wherein receipt of the control signal by said relay system enables said relay system to selectively direct copying of network data packets transferred between said first and second network interfaces to said third network interface.

21. An active tap system comprising:
 a) a first, second, and third network interface respectively coupleable to a first data network segment endpoint, a second data network segment endpoint, and a monitoring network segment endpoint;
 b) a relay system selectively operable to establish active and passive cross-connections between said first and second data network segment endpoints, wherein said active cross-connection is routed through said first and second network interfaces; and
 c) a controller coupled to said relay system and operative to select between said active and passive cross-connections and to direct a selective routing of said active cross-connection to said third network interface,
 said controller being further coupled to said first and second network interfaces and further operative to determine respective first and second network connection states relative to said first and second data network segment endpoints, and
 wherein said controller is further operative to autonomously evaluate predetermined failure conditions of said first and second network interfaces and said relay system and control the execution of a fast switch-over between said passive and active cross-connections by said relay system responsively to the autonomous evaluation.

22. The active tap system of claim 21 wherein said predetermined failure conditions include failure conditions determined via execution of a diagnosis process in said active tap system.

23. The active tap system of claim 21 further comprising a real-time clock circuit communicatively coupled to said controller, wherein said controller is operative to selectively perform fast switch-over from passive network communications to active network communications in response to information received from said real-time clock circuit regarding at least one of a frequency and a duration of said predetermined failure conditions.

24. The active tap system of claim 23 wherein said predetermined failure conditions include loss of applied power, and controller is operative to selectively delay performance of fast switch-over from passive network communications to active network communications in response to at least one of a frequency and a duration of said predetermined failure conditions resulting from a loss of applied power.

25. The active tap system of claim 21 wherein said predetermined failure conditions include loss of link through either of said first and second network interfaces, wherein said controller is operative to perform a fast switch-over from active network communications to passive network communications in response to the loss of link.

26. An active tap system comprising:
   a) a first, second, and third network interface respectively coupleable to a first data network segment endpoint, a second data network segment endpoint and a monitoring network segment endpoint;
   b) a relay system selectively operable to establish active and passive cross-connections between said first and second data network segment endpoints, wherein said active cross-connection is routed through said first and second network interfaces; and
   c) a controller coupled to said relay system and operative to select between said active and passive cross-connections and to direct a selective routing of said active cross-connection to said third network interface,
   wherein said controller includes a real-time clock circuit and a persistent memory,
   and, with reference to said real-time clock circuit, is operative to store operating data in said persistent memory, wherein said operating data includes a predetermined set of network connection parameters and predetermined failure conditions, time of failure occurrence data, and failure duration data, and
   wherein said controller is further operative to retrieve and apply said predetermined set of network connection parameters to said first and second network interfaces in performance of fast switch-over from a passive cross-connection state to an active cross-connection state and selectively delay performance of said fast switch-over responsively to said operating data.

27. The active tap system of claim 26 wherein said controller is operative to autonomously evaluate the frequency and duration of said predetermined failure conditions and determine a corresponding delay in performance of said fast switch-over to said active cross-connection state.

28. The active tap system of claim 26 wherein said controller is operative to retrieve and apply said predetermined set of network connection parameters to said first and second network interfaces in performance of a fast switch-over between active and passive cross-connection states, and wherein said controller is further operative to restrict execution of an auto-negotiation process of said first and second network interfaces in conjunction with the application of said predetermined set of network connection parameters to said first and second network interfaces, whereby mutually compatible network connection states are established on both said first and second network interfaces.

* * * * *